(12) United States Patent
Rod

(10) Patent No.: US 9,242,740 B2
(45) Date of Patent: Jan. 26, 2016

(54) ANCHORING DEVICE IN A HELICOPTER DECK

(71) Applicant: Marine Aluminium AS, Avaldsnes (NO)

(72) Inventor: Karl Johan Rod, Haugesund (NO)

(73) Assignee: Marine Aluminium AS, Avaldsnes (NO)

( * ) Notice: Subject to any disclaimer, the term of this patent is extended or adjusted under 35 U.S.C. 154(b) by 95 days.

(21) Appl. No.: 14/357,383

(22) PCT Filed: Nov. 21, 2012

(86) PCT No.: PCT/NO2012/050230
§ 371 (c)(1),
(2) Date: May 9, 2014

(87) PCT Pub. No.: WO2013/077742
PCT Pub. Date: May 30, 2013

(65) Prior Publication Data
US 2014/0312172 A1    Oct. 23, 2014

(30) Foreign Application Priority Data
Nov. 24, 2011   (NO) .................................. 20111624

(51) Int. Cl.
   *B64F 1/12*     (2006.01)
   *E01F 3/00*     (2006.01)
   *B63B 35/50*    (2006.01)

(52) U.S. Cl.
   CPC . *B64F 1/125* (2013.01); *E01F 3/00* (2013.01); *B63B 35/50* (2013.01)

(58) Field of Classification Search
   None
   See application file for complete search history.

(56) References Cited

U.S. PATENT DOCUMENTS

| | | | | |
|---|---|---|---|---|
| 3,303,807 A | * | 2/1967 | Gordon | B64F 1/10 105/159 |
| 3,365,162 A | | 1/1968 | Davis | |
| 3,552,688 A | * | 1/1971 | Baekken | B64F 1/125 244/115 |
| 3,552,689 A | * | 1/1971 | Baekken | B64F 1/125 244/115 |
| 3,567,161 A | * | 3/1971 | Adams | B64F 1/16 244/115 |
| 4,319,722 A | * | 3/1982 | Pesando | B64F 1/125 114/261 |
| 4,672,909 A | | 6/1987 | Sweetsir | |
| 5,209,431 A | * | 5/1993 | Bernard | B64C 25/66 244/100 R |

(Continued)

FOREIGN PATENT DOCUMENTS

KR    20110008807    9/2011

OTHER PUBLICATIONS

International Search Report for PCT/NO2012/050230 dated Mar. 27, 2013.

(Continued)

*Primary Examiner* — Medhat Badawi
(74) *Attorney, Agent, or Firm* — Andrus Intellectual Property Law, LLP

(57) ABSTRACT

An anchoring device in a helicopter deck, where a housing that is provided with an open top and lowered into the helicopter deck, contains a fastener which is vertically displaceable between a withdrawn, inactive position and an active position where an upper fastener portion extends at least partly up from the helicopter deck. The upper fastener portion is arranged to be detachably connected to an anchoring means. The housing is provided with a detachable lid arranged to be able to close tightly against the housing.

10 Claims, 3 Drawing Sheets

(56) References Cited

U.S. PATENT DOCUMENTS

| | | | |
|---|---|---|---|
| 5,497,962 A * | 3/1996 | Wood | B64F 1/14 244/115 |
| 6,019,314 A * | 2/2000 | Craig | B64F 1/12 114/261 |
| 6,125,779 A | 10/2000 | Czipri | |
| 6,488,460 B1 * | 12/2002 | Smith | F16B 5/01 411/339 |
| 6,712,569 B1 | 3/2004 | Wang et al. | |
| 6,764,259 B1 * | 7/2004 | Preta | B60P 7/0807 410/106 |
| 7,537,423 B1 | 5/2009 | Abato, Jr. | |
| 8,070,096 B2 * | 12/2011 | Wood | B64F 1/14 244/110 E |
| 8,568,070 B2 * | 10/2013 | Meszaros | B60P 7/0807 410/101 |
| 8,925,858 B2 * | 1/2015 | Spiral | B64F 1/125 244/115 |
| 2005/0230537 A1 * | 10/2005 | Chouery | B63B 17/00 244/116 |
| 2005/0236516 A1 * | 10/2005 | Kolliopoulos | B64D 47/04 244/17.17 |
| 2005/0254917 A1 * | 11/2005 | Nadherny | B61D 45/001 410/101 |
| 2006/0112869 A1 * | 6/2006 | King | B63B 13/00 114/218 |
| 2007/0120012 A1 * | 5/2007 | Ricker | B63B 43/32 244/116 |
| 2007/0215752 A1 * | 9/2007 | Steinkerchner | B64F 1/14 255/116 |
| 2009/0057486 A1 * | 3/2009 | Becht, IV | B64F 1/125 244/114 R |
| 2010/0124457 A1 * | 5/2010 | Cook | B60N 2/01558 403/409.1 |
| 2010/0320313 A1 * | 12/2010 | Hanafin | B64F 1/005 244/17.17 |
| 2011/0068224 A1 * | 3/2011 | Kang | B64C 39/024 244/116 |
| 2011/0265296 A1 | 11/2011 | Perkins | |
| 2012/0068013 A1 * | 3/2012 | Affre De Saint Rome | F16B 21/16 244/115 |
| 2014/0291443 A1 * | 10/2014 | Fisher | B64F 1/16 244/116 |
| 2015/0217871 A1 * | 8/2015 | Mardini | B64F 1/125 244/116 |

OTHER PUBLICATIONS

International Preliminary Report on Patentablility for PCT/NO2012/050230 dated Feb. 20, 2014.
Written Opinion for PCT/NO2012/050230 dated Mar. 27, 2014.
Response to Written Opinion for PCT/NO2012/050230 dated Mar. 27, 2014.
Written Opinion for PCT/NO2012/050230 dated Nov. 7, 2013.
Response to Written Opinion for PCT/NO2012/050230 dated Nov. 7, 2013.

* cited by examiner

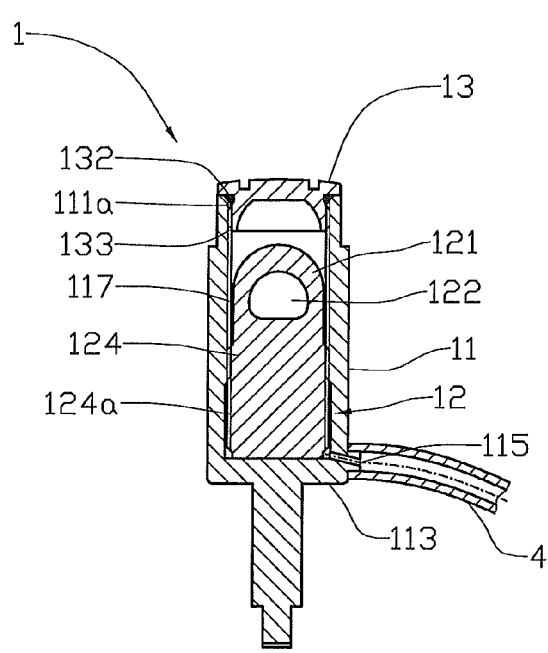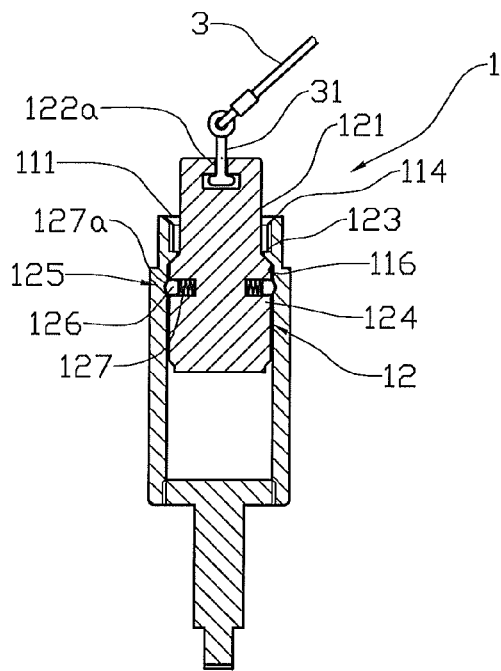
Fig. 3a    Fig. 3b
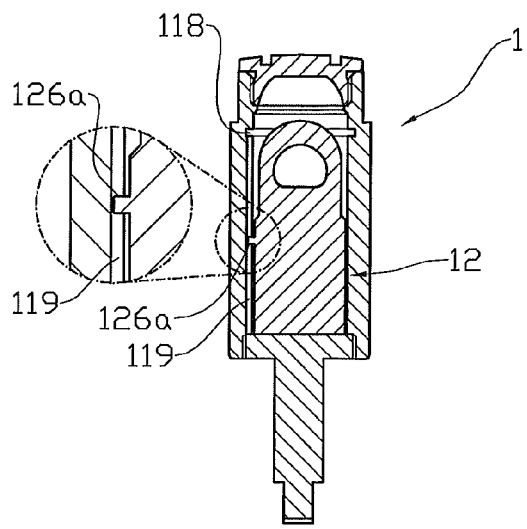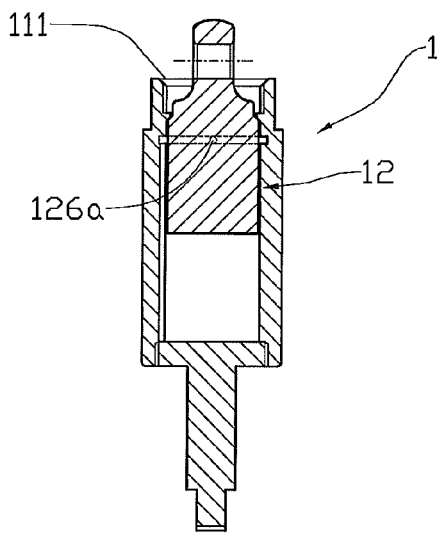
Fig. 3c    Fig. 3d

ANCHORING DEVICE IN A HELICOPTER DECK

CROSS-REFERENCE TO RELATED APPLICATIONS

This application is the U.S. national stage application of International Application PCT/NO2012/050230, filed Nov. 21, 2012, which international application was published on May 30, 2013, as International Publication WO2013/077742 in the English language. The international application is incorporated herein by reference, in entirety. The international application claims priority to Norwegian Patent Application No. 20111624, which is incorporated herein by reference.

FIELD

An anchoring device lowered into a housing in a helicopter deck, is described.

BACKGROUND

On helicopter decks where it, due to safety considerations for helicopter and surrounding structures, is necessary to secure the helicopter against wind damage, it is common practice to moor the rotor blades and the vessel body to the helicopter deck. The helicopter deck is normally provided with countersunk anchor points. With respect to governmental safety requirements imposing certain types of helicopter decks to be fluid tight, so that any fuel leakage is not lead through the helicopter deck to underlying structures, such countersunk anchor points are arranged in fluid tight housings. An anchoring element fixed in the housing, is accessible through an open top of the housing. Water and extraneous matter could therefore accumulate in these recessions, and under frost conditions, formation of ice in the recessions could complicate the access to the anchoring point.

SUMMARY

The invention has for its object to remedy or to reduce at least one of the drawbacks of the prior art, or at least provide a useful alternative to prior art.

The object is achieved through features described in the description below and in the patent claims that follow.

An anchoring device is provided on a helicopter deck where a fastener that in an upper portion is formed to be able to receive a fastening line or the like extending from the helicopter, is arranged in a housing countersunk into the helicopter deck. The housing comprises an open top which is closeable by means of a lid. The lid is designed to restrain fluid penetrating into the housing and may be designed to be fluid tightening against the housing in a mounted position. An upper end surface of the housing is mainly in plane with the surface of the helicopter deck.

The upper portion of the fastener may be designed having one or more cut outs, for example a pad eye for leading said fastening line through or for receiving a hook in the fastening line, or a coupling portion arranged to be able to go into locking engagement with an element attached to the fastening line, typically a recess with an opening provided with a latch groove.

The fastener contained by the housing is arranged vertically displaceable between a withdrawn, inactive position, where the fastener as a whole is placed under the surface of the helicopter deck, and a pulled-up, active position where an upper portion of the fastener protrudes up through the open top of the housing and is easily accessible for an operator who will fasten said fastening line to the upper portion of the fastener. In its pulled-up, active position the fastener may close fluid tightly against the housing, so that no fluid can enter into the housing.

The displacement of the fastener may be provided by a gliding connection between a peripheral surface on the fastener and an inner wall portion of the housing. The displacement is advantageously limited by means of an upper ledge. The fastener and the housing comprise means arranged to be able to fix the fastener relative to the housing when the fastener is arranged in its pulled-up, active position. In one embodiment the displacement is provided as a thread connection between a cylinder surface on the fastener and the inner wall portion of the housing.

The housing comprises a bottom portion which may be closed and which alternatively may be provided with a drainage opening possibly connected to a discharge pipe. The safety requirements, regarding collection of any fuel leakages and the like into the housing, are thereby attended to.

The anchoring device may comprise a combination tool arranged to be able to go into engagement with a portion of the lid or a portion of the fastener for use when the lid is to be mounted or removed, or when the fastener is displaced between an inactive and an active position.

The lid may preferably comprise an upwardly protruding, non-circular portion, for example a polygonal portion, which may be enclosed by an end surface of the combination tool. The surface of the lid will thus not be provided with any recesses which may be filled with fluid and which again may freeze to ice and thereby block the connection of tools for use on disassembling the lid.

The combination tool is further provided with a portion arranged to be able to go into locking, detachable engagement with the upper fastener portion.

The invention more specifically relates to an anchoring device in a helicopter deck, characterized in that a housing that is provided with an open top and lowered into the helicopter deck, contains a fastener which is vertically displaceable between a withdrawn, inactive position and an active position where an upper fastener portion extends at least partly up from the helicopter deck and where the upper fastener portion is arranged to be detachably connected to an anchoring means; and the housing is provided with a detachable lid arranged to be able to close tightly against the housing.

The lid may in its closed position close fluid tightly against the housing.

An upper end surface of the housing may be planar to the surface of the helicopter deck.

The fastener may in its pulled-up, active position close fluid tightly against the housing.

The upper fastener portion may comprise a cut out arranged to receive a portion of a fastening line.

The upper fastener portion may comprise a coupling portion arranged to be able to go into locking engagement with an anchoring element associated with the fastening line.

The housing may comprise a bottom portion provided with a drainage opening leading into a discharge pipe.

The fastener may comprise a sealing portion arranged to be able to bear against a contact surface in the housing.

The fastener may be provided with an external thread portion arranged to be able to engage with an inner thread portion in the housing.

One of the fastener and the housing may be provided with one or more outwardly protruding or inwardly protruding locking elements respectively, arranged to be able to go into locking engagement with a corresponding groove in the other of the fastener and the housing when the fastener is displaced up into its active position.

The locking element may be an resilient pin or ball arranged in a second cut-out in one of the fastener and the housing. Alternatively the locking element may be a fixed pin extending respectively outwardly and inwardly from one of the fastener and the housing, and when the fastener is displaced from its active position, is in sliding engagement with a guide track arranged in the second of the fastener and the housing.

The lid may be provided with an upwardly extended, non-circular centre portion.

A combination tool may comprise a first engagement portion arranged to be able to go into locking engagement with the upwardly protruding centre portion of the lid, and a second engagement portion arranged to be able to go into locking engagement with the upper fastening portion.

BRIEF DESCRIPTION OF THE DRAWINGS

In the following an example of a preferred embodiment which is illustrated in the enclosed drawings, is described, where:

FIG. 3a shows an axial cross-section of the anchoring device according to a first embodiment of the invention, where a fastener is arranged in an inactive position withdrawn in a housing, and the housing is closed with a lid;

FIG. 3b shows an axial cross-section of a second embodiment of the anchoring device, where the fastener is arranged in an active position;

FIGS. 3c and 3d shows an axial cross-section of a third embodiment of the anchoring device in an inactive and closed, respectively active position.

DETAILED DESCRIPTION OF THE DRAWINGS

Figure 1:
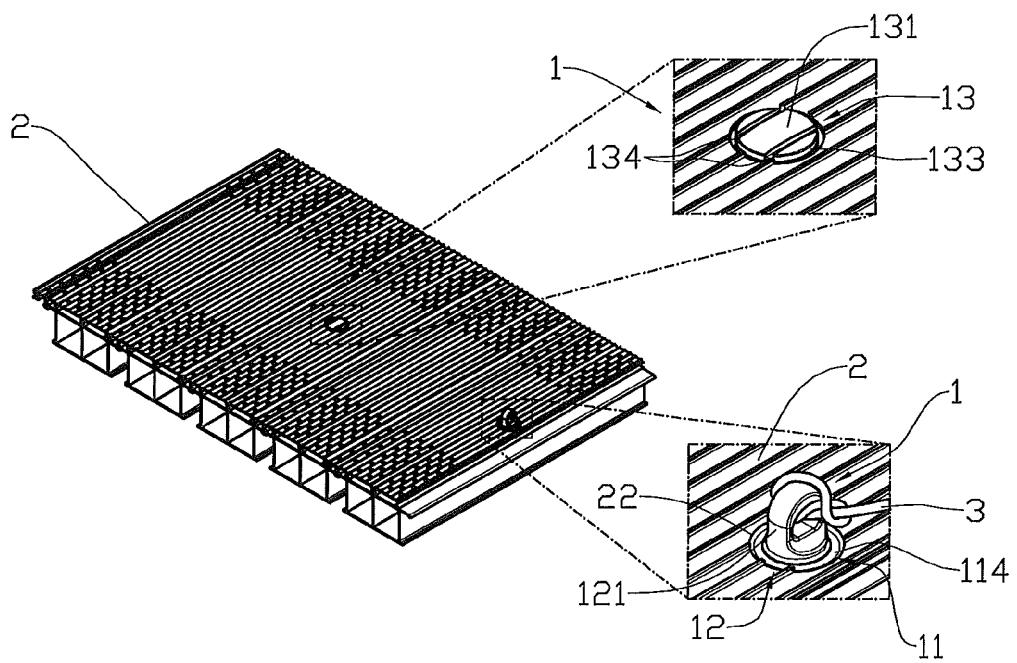
FIG. 1 shows in perspective a section of a helicopter deck with anchoring devices lowered into the helicopter deck, the first anchoring device being arranged in an inactive position, and a second anchoring device being arranged in an active position.
Figure 2:
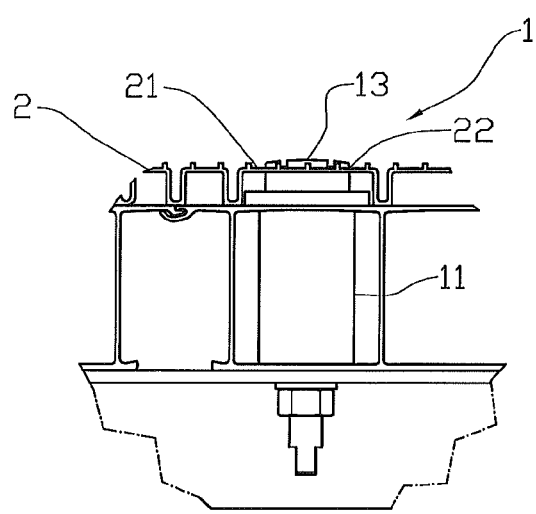
FIG. 2 shows a side view of a section of the helicopter deck where the anchoring device is in an inactive position.

In the figures the reference numeral 1 denotes an anchoring device lowered into a helicopter deck 2 for securing a helicopter (not shown) with anchoring means 3 (see FIG. 1), for example fastening lines of a per se known kind.

The anchoring device 1 comprise a housing 11 fixed in a cut-out 22 in the helicopter deck 2 in such a way that an upper end surface 114 is approximately planar to a surface 21 on the helicopter deck 2. The housing 11 is cylinder shaped and has an open top 111 (see the FIGS. 3b and 3d) which is closeable by means of a lid 13 (see the FIGS. 3a and 3c).

Reference is now made to FIG. 3a. The housing 11 houses a fastener 12 which is arranged vertically displaceable in the housing 11 between an inactive position where the fastener 12 is completely withdrawn into the housing 11, and an active position where an upper fastening portion 121 protrudes up from the housing 11 and thereby up above the surface 21 of the helicopter deck 2, as shown in FIG. 1.

The upper fastening portion 121 is in one embodiment (see FIG. 3a) provided with a cut-out 122 forming an eye arranged for insertion of a portion of the anchoring means 3 (see FIG. 1) or an anchoring element (not shown) arranged on the anchoring element 3, for example a hook. In another embodiment (see FIG. 3b) the upper fastening portion 121 is provided with a cut-out arranged as a vertical recession provided with latch groove 122a and arranged to receive a portion 31 of said anchoring element 3.

A mid portion 124 of the fastener 12 is in one embodiment (see FIG. 3a) provided with threads 124a arranged to be able to go into engagement with a corresponding thread portion 117 on the inner wall of the housing 11. By rotating the fastener 11 it can be displaced between its inactive and active position.

In another embodiment (see FIG. 3b) the mid portion 124 is provided with outwardly protruding, resilient locking elements 125 in the form of spring loaded balls 126 arranged in a second cut-out 127. A corresponding latch groove 127a in the wall of the housing 11 is arranged to receive the ball 126 when the fastener 12 is displaced to its active position. The locking element 125 is brought out of the locking engagement with the housing 11 by applying a downwardly directed force to the fastener 12.

In yet an embodiment (see FIGS. 3c and 3d) the mid portion 124 of the fastener 12 is provided with an outwardly protruding, fixed pin 126a arranged to be able to go into engagement with a vertical guide groove 119 arranged in the housing 11. The guide groove 119 leads in an upper end out into a latch groove 118, and by displacing the fastener 12 vertical to the pin's 126a ledge against an upper side edge of the latch groove 118 and thereafter turning the fastener 12 about its axis, the fastener 12 will be vertically fixed.

In the fastener's 12 active position, in an embodiment as shown in FIGS. 3b and 3d, a sealing portion 123 is at least partly sealingly positioned against a contact surface 116 arranged in the housing 11 such that penetration of fluid in the form of for instance water or fuel into the housing 11 is restrained or prevented.

In one embodiment (see FIG. 3a) a bottom portion 113 of the housing 11 is provided with a drainage opening 115 leading into a discharge conduit 4 arranged to be able to lead fluid away from the housing 11. Thus any penetration of fluid into the housing 11 is drained away in order to avoid corrosion of the anchoring device 1, freezing of the fastener 12 in the housing 11 or addition of fluid to structures beneath the helicopter deck 2.

The lid 13 is preferably, and as shown in FIG. 3a, provided with engagement means 133 for locking engagement with a corresponding portion 111a of the housing 11, typically formed as threads. In this embodiment the lid 13 is also provided with a gasket 132 for further preventing penetration of fluid into the housing 11.

The upwardly facing surface of the lid 13 when in its position of use, is provided with a polygonal, upwardly protruding centre portion 131 (see FIG. 1), here defined by the periphery 133 of the lid 13 and two parallel grooves 134 formed straight through the end surface of the lid 13. This shape of the lid 13 prevents any accumulation of fluid on it.

Figure 4A:
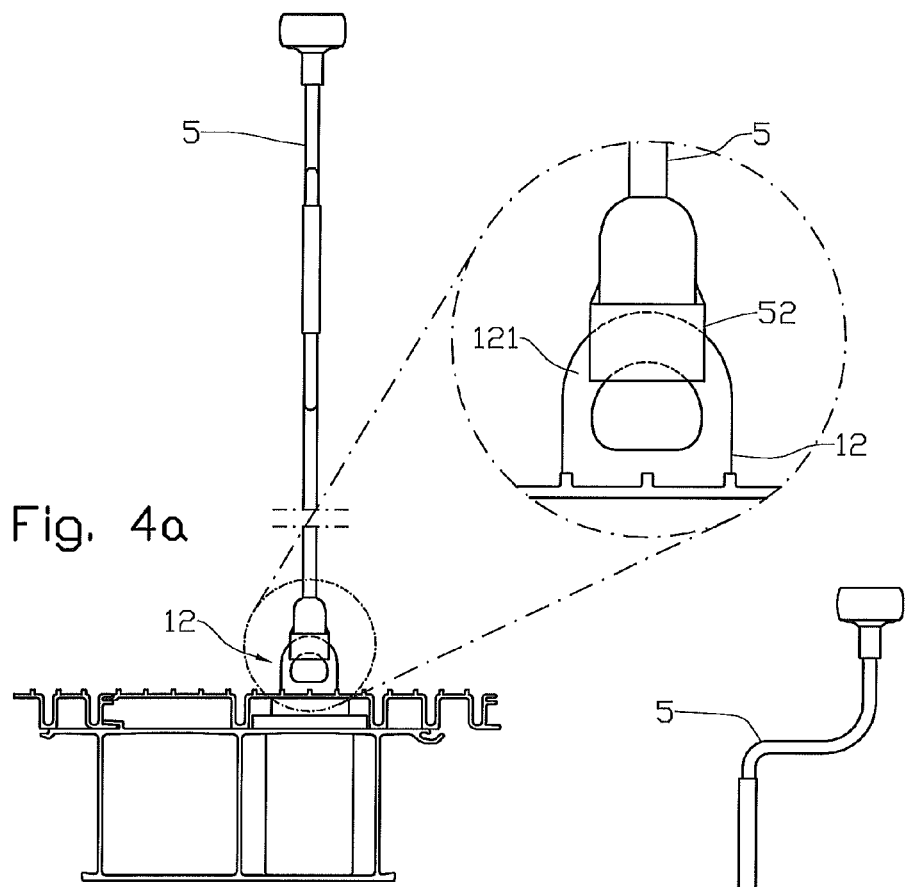
FIGS. 4a and 4b shows a side view of a tool in engagement with the fastener for vertical displacement of the fastener, respectively in engagement with the lid for mounting or dismounting the lid.
Figure 4B:
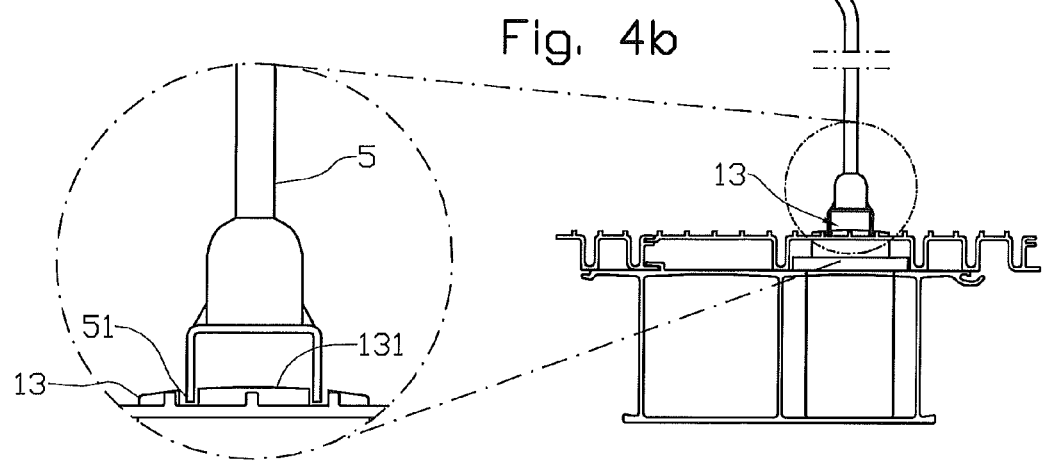

Reference is now made to the FIGS. 4a and 4b. A tool 5 comprises a first engagement portion 51 arranged to be able to go into engagement with the centre portion 131 when the lid 13 is to be mounted or removed. A second engagement portion 52 is arranged to be able to go into locking engagement with the upper portion 121 of the fastener 12 when the fastener is to be displaced from an inactive to an active position or the opposite.

When a helicopter is parked on the helicopter deck 2 and is going to be secured, the lid 13 is removed from a selection of anchoring devices 1. The respective fasteners 12 are displaced to their active position with their upper fastener portions 121 upwardly protruding above the surface 21 of the deck, and the anchoring means 3 are arranged between thereto suitable fastening points on the helicopter and the respective anchoring devices 1.

Any fluid present in the area around an anchoring device 1 will not be able to penetrate into the housing 11 as long as the lid 13 closes sealingly against the housing 11, nor when the fastener 12 is in its active position and is provided with a sealing contact against the inner contact surface 116 of the housing 11. Any fluid penetrating into the housing 11 is drained away through the drainage opening 115 of the housing 11. The anchoring device 1 will thus not accumulate fluid, and there is no risk of inner ice formation and the subsequent disruption in the use of the anchoring device 1. Any inflow of fluid would be drained off from the anchoring device 1 through the discharge conduit 4 which is connected to the drainage opening 115 of the anchoring device 1.

When the anchoring device 1 is not in use and the fastener 12 is displaced down into the housing 11 to its inactive position and the lid 13 is placed on the housing 11, the helicopter deck 2 is substantially plane without any recessions or upwardly protruding elements connected to the anchoring device 1, the surface of the lid 13 being fairly in plane with the surface 21 of the deck.

The invention claimed is:

1. An Anchoring device in a helicopter deck, the Anchoring device comprising:
   a housing having an open top and lowered into the helicopter deck, wherein the housing contains a fastener that is vertically displaceable between a withdrawn, inactive position and an active position where an upper fastener portion extends at least partly up from the helicopter deck;
   wherein the upper fastener portion is detachably connected to anchoring means;
   wherein the housing has a detachable lid that, in a closed position, is closed fluid tightly against the housing;
   wherein an upper end surface of the housing is planar with a surface of the helicopter deck; and
   wherein the fastener in the active position closes fluid tightly against the housing, the fastener comprising a sealing portion that abuts a contact surface in an upper portion of the housing.

2. The Anchoring device in accordance with claim 1, wherein the upper fastener portion comprises a cut-out, wherein the cut-out receives a portion of the anchoring means.

3. The Anchoring device in accordance with claim 1, wherein the upper fastener portion comprises a coupling portion that is movable into locking engagement with a fixing element associated with the anchoring means.

4. The Anchoring device in accordance with claim 1, wherein the housing comprises a bottom portion having a drainage opening which leads into a discharge conduit.

5. The Anchoring device in accordance with claim 1, wherein the fastener is provided with an outer thread portion that is movable into engagement with an inner thread portion in the housing.

6. The Anchoring device in accordance with claim 1, where wherein one of the fastener and the housing has one or more outwardly protruding, respectively inwardly protruding locking elements that are movable into locking engagement with a corresponding latch groove in the other of the fastener and the housing when the fastener is displaced up to the active position.

7. The Anchoring device in accordance with claim 6, wherein the locking element comprises a resilient pin or ball located in a second cut-out in one of the fastener and the housing.

8. The Anchoring device in accordance with claim 6, wherein the locking element is a fixed pin protruding respectively outwardly and inwardly from one of the fastener and the housing, and wherein when the fastener is displaced from the active position, the fastener is in sliding engagement with a guide track in the second of the fastener and the housing.

9. The Anchoring device in accordance with claim 1, wherein the detachable lid comprises an upwardly protruding, non-circular center portion.

10. The Anchoring device in accordance with claim 1, further comprising a tool having a first engagement portion that is movable into locking engagement with an upwardly protruding center portion of the detachable lid, and a second engagement portion that is movable into locking engagement with the upper portion of the fastener.

* * * * *